United States Patent
Eggleton et al.

(10) Patent No.: US 10,661,978 B2
(45) Date of Patent: May 26, 2020

(54) BUMPER AND METHODS OF MAKING AND SHIPPING BUMPERS

(71) Applicant: American Plastic Technologies, LLC, Chino, CA (US)

(72) Inventors: David Eggleton, Anaheim, CA (US); Steven Shneider, Silverado, CA (US)

(73) Assignee: American Plastic Technologies, LLC, Chino, CA (US)

( * ) Notice: Subject to any disclaimer, the term of this patent is extended or adjusted under 35 U.S.C. 154(b) by 193 days.

(21) Appl. No.: 15/593,263

(22) Filed: May 11, 2017

(65) Prior Publication Data
US 2017/0327262 A1   Nov. 16, 2017

Related U.S. Application Data

(60) Provisional application No. 62/334,992, filed on May 11, 2016.

(51) Int. Cl.
| | |
|---|---|
| *B65B 63/08* | (2006.01) |
| *B65D 85/68* | (2006.01) |
| *B65B 25/00* | (2006.01) |
| *B29C 45/00* | (2006.01) |
| *B29L 31/30* | (2006.01) |

(52) U.S. Cl.
CPC ............. *B65D 85/68* (2013.01); *B65B 25/00* (2013.01); *B29C 45/0001* (2013.01); *B29K 2995/00* (2013.01); *B29K 2995/0012* (2013.01); *B29L 2031/3044* (2013.01); *B65B 63/08* (2013.01); *B65D 2585/6887* (2013.01)

(58) Field of Classification Search
CPC ......... B65D 85/68; B65B 63/08; B65B 63/04; B65B 63/02; B60R 19/03; B29L 2031/3044
USPC ..................................... 53/436, 438
See application file for complete search history.

(56) References Cited

U.S. PATENT DOCUMENTS

| | | | | |
|---|---|---|---|---|
| 5,804,511 | A * | 9/1998 | Kelman | B29C 67/246 442/172 |
| 2002/0003014 | A1 * | 1/2002 | Homma | C22F 1/006 148/563 |
| 2003/0055198 | A1 * | 3/2003 | Langer | B29C 61/003 528/80 |
| 2005/0275246 | A1 * | 12/2005 | Browne | B60R 21/38 296/187.04 |

(Continued)

*Primary Examiner* — Chelsea E Stinson
*Assistant Examiner* — Mary C Hibbert-Copeland
(74) *Attorney, Agent, or Firm* — CIONCA IP Law P.C.; Marin Cionca

(57) ABSTRACT

A method of manufacturing, packing and shipping a vehicle bumper having the steps of dispensing into a bumper mold a shape-memory composition to form an original shape of an integral shape-memory vehicle bumper having a middle portion and a first end and a second end both extending from opposite ends of the middle portion, the shape-memory vehicle bumper having the original shape fitting in a first shipping box; applying force to the shape-memory vehicle bumper such that to cause a conversion of the original shape into a deformed shape of the shape-memory vehicle bumper, the deformed shape fitting into a second shipping box that is a fraction by volume of the first shipping box; placing the shape-memory vehicle bumper having the deformed shape into the second shipping box; and sealing and shipping the second shipping box.

14 Claims, 15 Drawing Sheets

(56) References Cited

U.S. PATENT DOCUMENTS

2010/0028686 A1\* 2/2010 Xie .................... B29C 61/0616
  428/413
2010/0101974 A1\* 4/2010 Eskenazi .............. B65D 25/101
  206/591

\* cited by examiner

BUMPER AND METHODS OF MAKING AND SHIPPING BUMPERS

CROSS-REFERENCE TO RELATED APPLICATIONS

This application claims the benefit of U.S. Provisional Application No. 62/334,992, filed on May 11, 2016, which is hereby incorporated by reference, to the extent that it is not conflicting with the present application.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF INVENTION

1. Field of the Invention

The invention relates generally to the manufacture and shipping of vehicle bumpers.

2. Description of the Related Art

A bumper for a vehicle is a very large item and thus, it must be shipped typically by freight. Freight shipping can be very expensive, and can be even more than the cost of the bumper itself, and can take weeks for delivery, domestically. Loss and damage rates for freight shipments are also much higher than that of regular ground shipments, and materials used for the construction of vehicle bumpers, such as fiberglass, may also be rigid and thus susceptible to breakage or denting. Additionally, international freight shipping is even more expensive, and with the added problem of being capable of shipping only to the local port (airport or seaport) instead of directly to the user. Thus, a more efficient and cost-effective method of shipping bumpers is needed.

Existing body kit or stock (OEM) bumpers are often made from fiberglass, which also may be referred to as FRP, a stiff, rigid material, or other similar materials such as ABS plastic, or other rigid plastics. These bumpers can be hand-laid, which can result in imperfections, split seams, waves, air bubbles, and so on in the material. These bumpers may also be susceptible to cracks and dents, and are easily broken. These bumpers often undergo normal wear and tear damage, which may be costly to repair, and they can also be easily damaged during shipping as well. Thus, a more durable option for bumpers is needed.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect a composition is provided that allows for the construction of a bumper that may be folded, wherein the composition is a blend of isocyanate, resin, and a memory agent.

In an aspect a method of making a foldable bumper by a composition of an isocyanate, resin, and a memory agent blend is provided. Thus, an advantage is the bumper can be folded into a compact shape, and can return to its original shape if dented or damaged.

In an aspect a bumper that can be folded for shipment is provided, wherein the bumper is constructed from isocyanate with resin, the resin having a memory agent. The bumper can then return to its original shape due to the memory agent when the bumper is unfolded or dented.

In an aspect a method of shipping a foldable bumper is provided, wherein a foldable bumper is folded into a compact shape and optionally tied together to hold the bumper together in this shape, and packed into a standard shipping box. Thus, an advantage is that a bumper can be shipped by faster and more cost-effective ways. The bumper can be shipped by ground, rather than freight, making for a much more timely and cost-efficient shipping. Another advantage is that international shipments can be delivered directly to the user, rather than with freight to the local port. Another advantage is that if the bumper is dented it can be easily returned to its original shape by the user.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
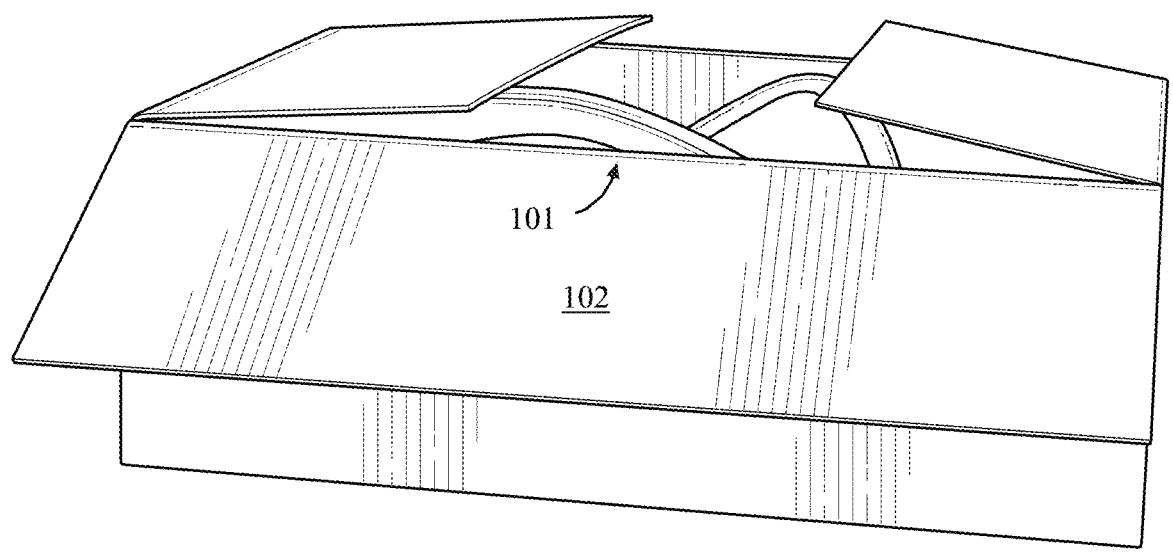
FIG. 1 shows the top perspective view of a foldable bumper in a folded state, packaged in a shipping box, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

For the following description, it can be assumed that most correspondingly labeled elements across the figures (e.g., 101 and 201, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 shows the top perspective view of a foldable bumper 101 ("foldable bumper," or "bumper") in a folded state, packaged in a shipping box 102, according to an aspect. The foldable bumper 101 may be constructed from a composition that allows folding, which may be more resilient to changes in shape and resistant to denting or breaking. As an example, application of heat may allow for the bumper to return to its original shape by the user. The compact size of the foldable bumper 101 in its folded state may allow for it to be shipped by cost-effective means, without the need for freight shipping. By folding the foldable bumper 101 into a compact size and shape, a shipping box 102 having measurements accepted by shipping services for international or domestic shipments may be used for containing the bumper 101. The bumper may be constructed to be foldable by constructing it from a composition of a blend of isocyanate, resin, and a memory agent. For example, the bumper may be constructed to be foldable by constructing it from a composition of a blend of approximately 50% by weight isocyanate and 50% by weight resin, with approximately 5% by weight+/−variance for each, with the resin containing approximately 2%-12% by weight of a memory agent. As an example, the resin may comprise approximately 5% by weight of the memory agent. After it cures, the composition may preferably have 60-70 (D scale) of Shore hardness. The memory agent may allow the bumper to return to its original shape after being folded. Another advantage may be that during use with a vehicle, the memory agent may prevent dents and other damage from normal wear and tear. The user may apply heat to a damaged area of the bumper and thus allow the bumper to return to its original shape, due to the memory agent. The composition used to construct the bumper 101 may be more durable and resistant to cracks and dents than fiberglass, or ABS plastic.

The bumper may be constructed from the composition using an injection molding process. The composition, which may be a shape-memory composition, may be in a liquid form when injected into precision molds. The composition may be dispensed into a bumper mold to form an original shape of an integral shape-memory vehicle bumper. The vehicle bumper may have a middle portion and a first end and a second end both extending from opposite ends of the middle portion. As an example, two-sided molds may be used for constructing the foldable bumper. The two sides may be clamped together, and then the liquid composition may be injected into the mold. Thus, an advantage may be that consistently constructed bumpers may be produced.

Figure 2:
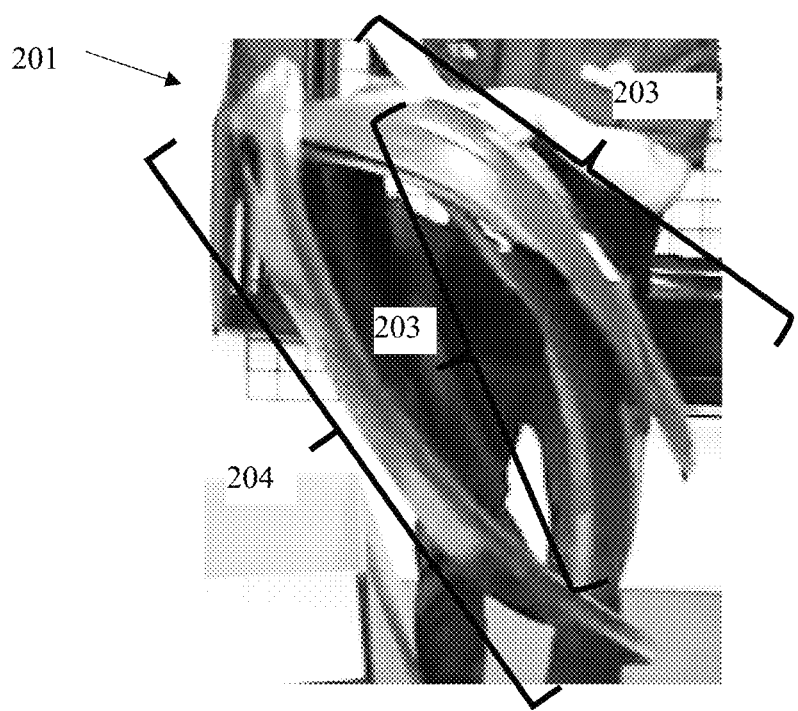
FIG. 2 shows the top view of a foldable bumper in a folded state, according to an aspect.

FIG. 2 shows the top view of another example of a foldable bumper 201 in a folded state, according to an aspect. The entire length of the foldable bumper 201 may be equal to two lengths 203 ("lengths," or "ends"), a first end and second end, each length 203 being the two ends of the foldable bumper, and a second length 204 ('second length," or "middle"), the second length 204 being the middle of the foldable bumper 201. As shown, the first end and second end of the bumper may be folded over the middle section 204 of the bumper 201, such that the bumper 201 is compact enough for ground shipping. The bumper 201 may return to its original shape when unfolded and allowed to warm, for example, in the sun for approximately fifteen minutes. To fold the bumper 201, the bumper 201 may be warmed and shaped the first end and second end may be folded over each other, over the middle of the bumper 201.

Figure 3:
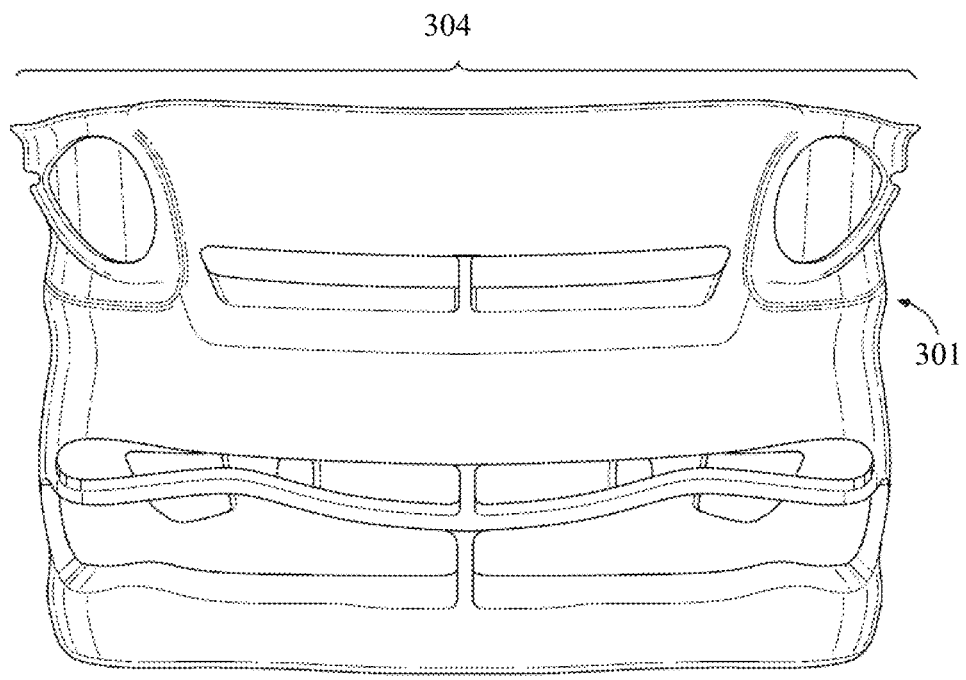
FIG. 3 shows the front view of a foldable bumper held together in a folded state by an optional band, according to an aspect.

FIG. 3 shows the front view of a foldable bumper 301 held together in a folded state by a band (not shown), according to an aspect. For packaging and shipping purposes, the foldable bumper 301 may be folded into a compact shape as shown, and the two ends (as shown in FIG. 2) may optionally be held together by, for example, a band, string, or any other suitable means. The folded ends may fit entirely behind the length 304 of the middle of the foldable bumper 301.

Figure 4:
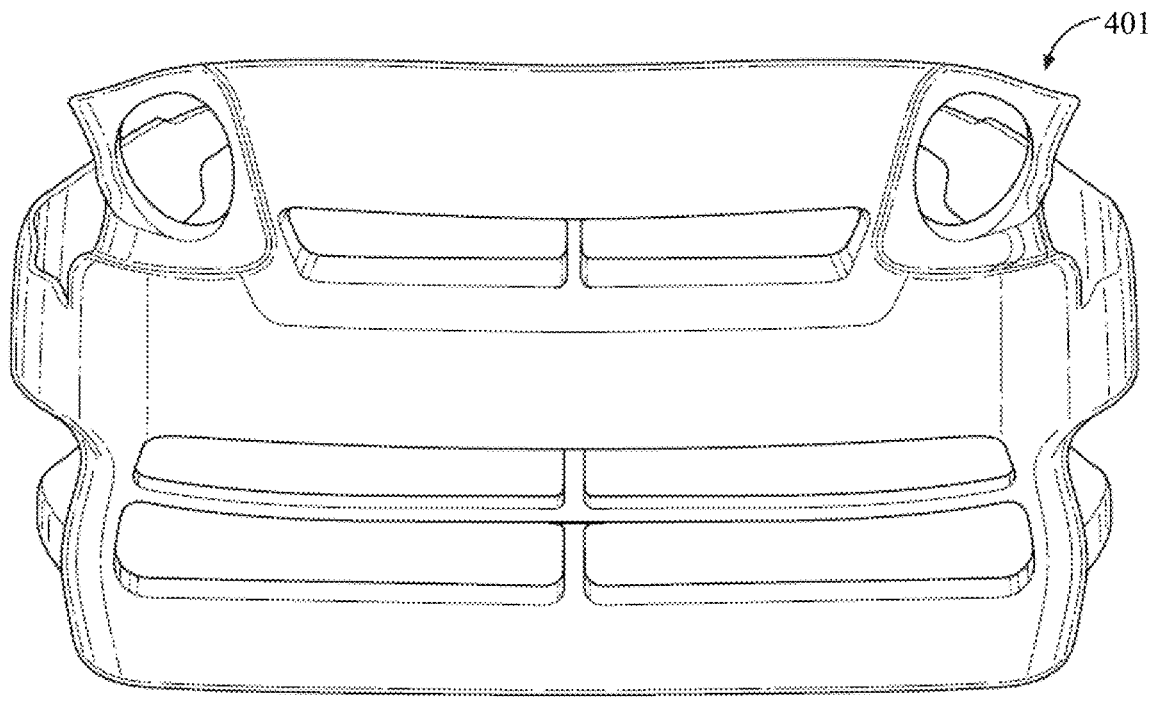
FIG. 4 shows the front view of a foldable bumper with the band removed, in a partially unfolded state, according to an aspect.

FIG. 4 shows the front view of a foldable bumper 401 with the band removed, in a partially unfolded state, according to an aspect. A user may remove the band or other means for securing the ends of the foldable bumper to begin the unfolding process. The user may then leave the foldable bumper 401 exposed to heat, such as, for example, by leaving the foldable bumper 401 in sunlight. As an example, approximately fifteen minutes in sunlight may return the foldable bumper 401 to its original shape.

Figure 5:
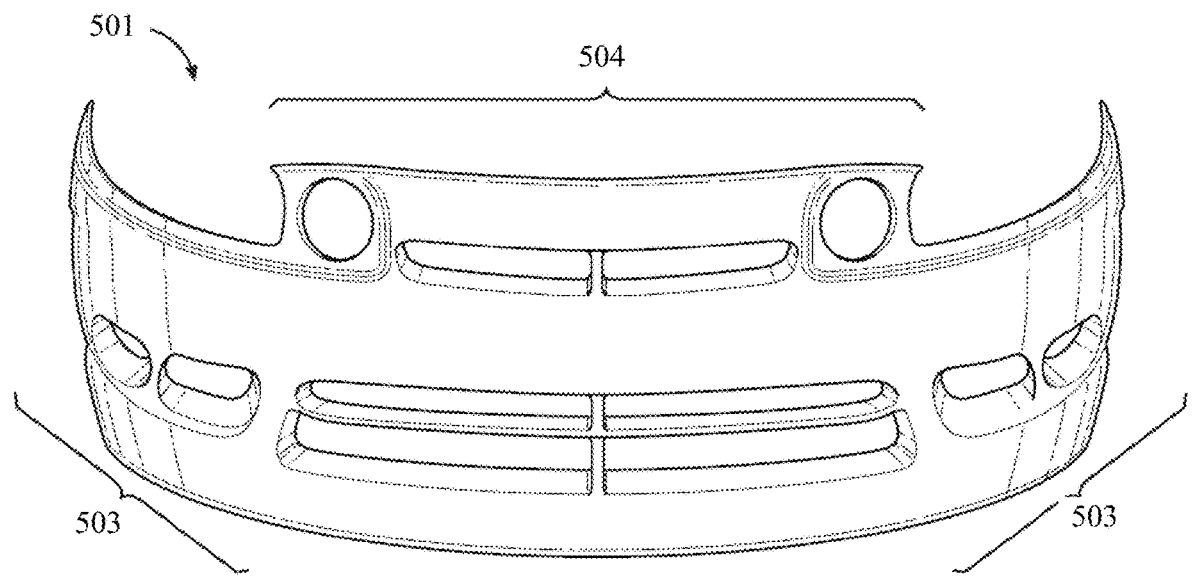
FIG. 5 shows the front view of a foldable bumper in an unfolded state and in its original shape, according to an aspect.

FIG. 5 shows the front view of a foldable bumper 501 in an unfolded state and in its original shape, according to an aspect. The foldable bumper 501 may be completely returned to its original shape as shown, when exposed to heat, for example. The foldable bumper 501 ends 503 may be extended from the middle 504 of the foldable bumper 501, and take a shape that may conform to the shape of a vehicle, for example. When the foldable bumper 501 has fully returned to its original shape, it may be smooth with no visible lines of where the bumper 501 was folded. The bumper 501 may then be painted and installed on the vehicle. It should be understood that the process may be reversed for packing and shipping a foldable bumper 501. The bumper 501 may be exposed to heat, for example, for approximately fifteen minutes, and folded into a compact shape as seen in FIG. 2. The bumper 501 may then be folded, and packaged in any suitable box for ground shipping, for example.

Figure 6:
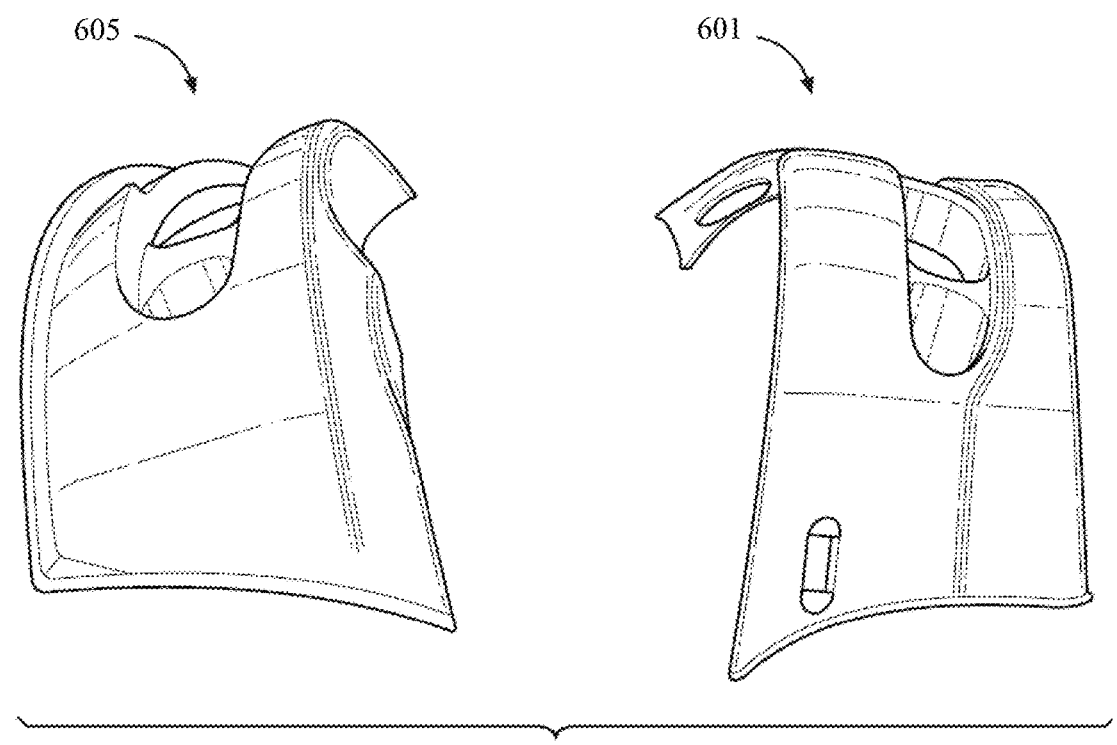
FIG. 6 shows the side perspective views of a fiberglass bumper as known in the art, and a foldable bumper, according to an aspect.

FIG. 6 shows the side perspective views of a fiberglass bumper 605 as known in the art, and a foldable bumper 601, according to an aspect. The fiberglass bumper 605 and foldable bumper 605 were used in an experiment as described in the FIGS. 7a-9b.

Figure 7A:
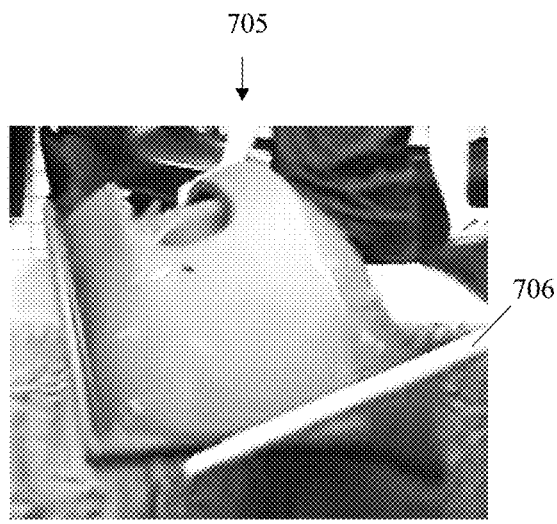
FIGS. 7a-7b show the side perspective views of a fiberglass bumper and a foldable bumper, respectively, hit with a steel pipe, according to an aspect.
Figure 7B:
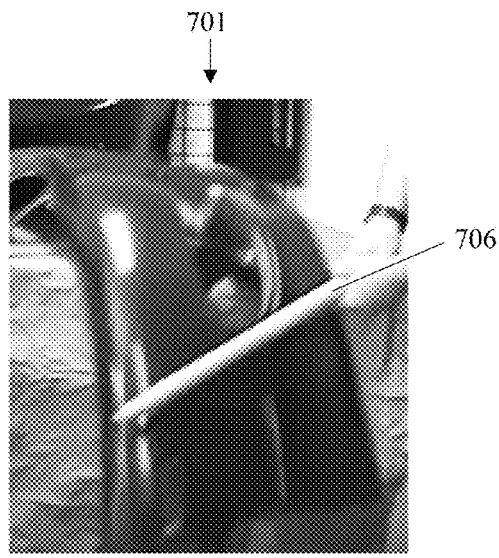

FIGS. 7a-7b show the side perspective views of a fiberglass bumper 605 and a foldable bumper, respectively, hit with a steel pipe, according to an aspect. An experiment was performed to test the durability of the foldable bumper 601, wherein a steel pipe 706 was used to strike the fiberglass bumper 705 and the foldable bumper 701. Each bumper 706 and 701 was struck three times, twice at the side of the bumpers 705 and 701 as shown in FIGS. 7a-7b, and once at the front (being the top of the bumpers 705 and 701 in drawing FIGS. 7a-7b).

Figure 8:
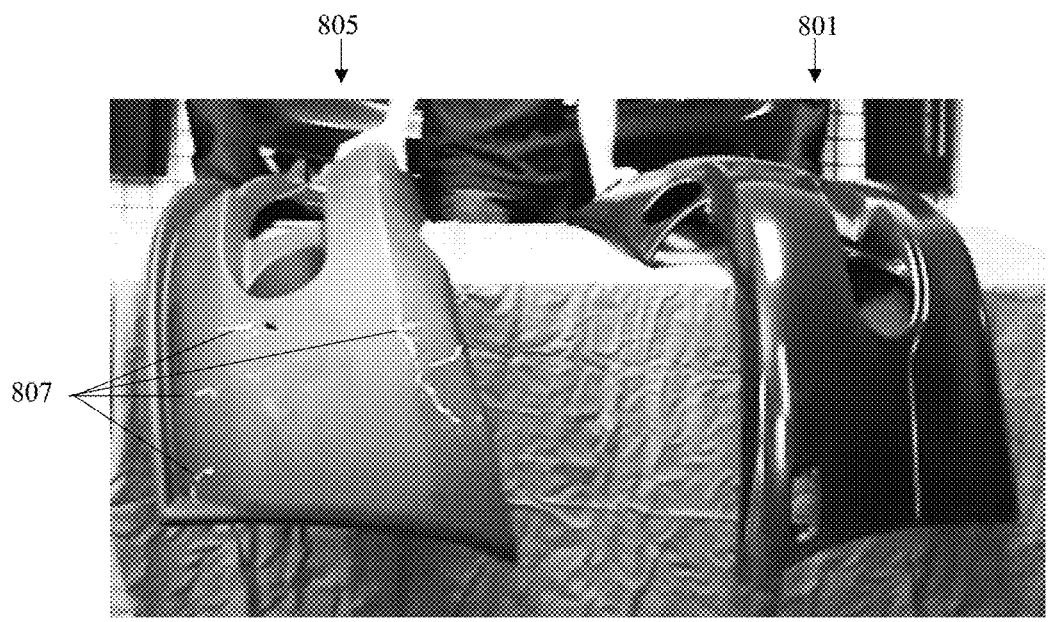
FIG. 8 shows the side perspective views of a fiberglass bumper and a foldable bumper after the conduction of the experiment described when referring to FIGS. 7a-7b, according to an aspect.

FIG. 8 shows the side perspective views of a fiberglass bumper 805 as known in the art, and a foldable bumper 801 after the conduction of the experiment described when referring to FIGS. 7a-7b, according to an aspect. After the experiment, the fiberglass bumper 805 showed signs of damage as indicated by scratches 807. The foldable bumper 801 did not show any signs of damage and remained similar in appearance as it did prior to the experiment, as seen in FIG. 6.

Figure 9A:
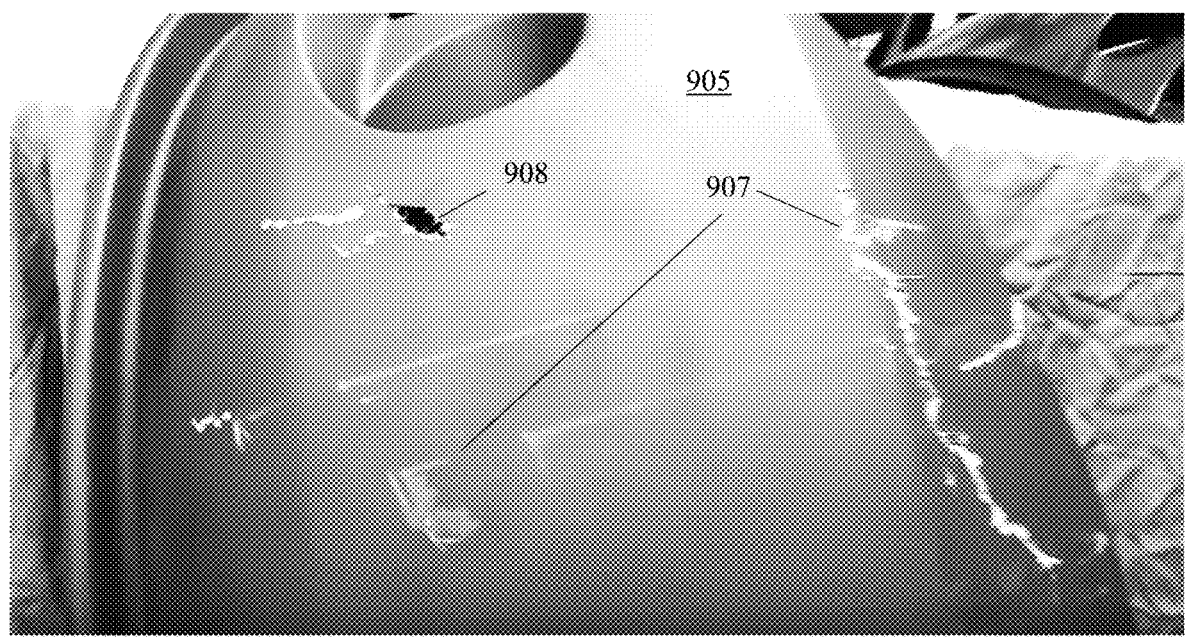
FIGS. 9a-9b show a detailed side views of the fiberglass bumper and the foldable bumper of FIG. 8, after the conduction of the experiment described when referring to FIGS. 7a-7b, according to an aspect.
Figure 9B:
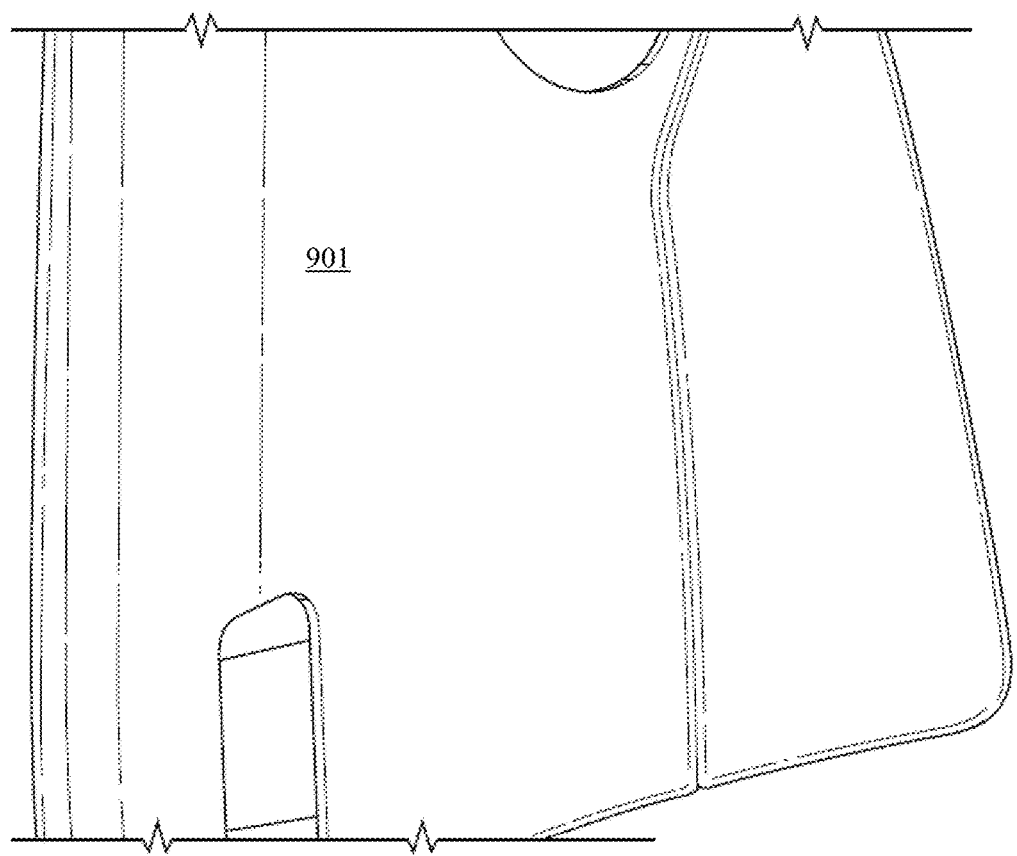

FIGS. 9a-9b show a detailed side views of the fiberglass bumper 905 and the foldable bumper 901 of FIG. 8, after the conduction of the experiment described when referring to FIGS. 7a-7b, according to an aspect. The fiberglass bumper 905 showed visible signs of damage, as indicated by scratches 907 and a hole 908. The foldable bumper 901 showed no visible signs of damage, as shown in FIG. 9b.

Figure 10:
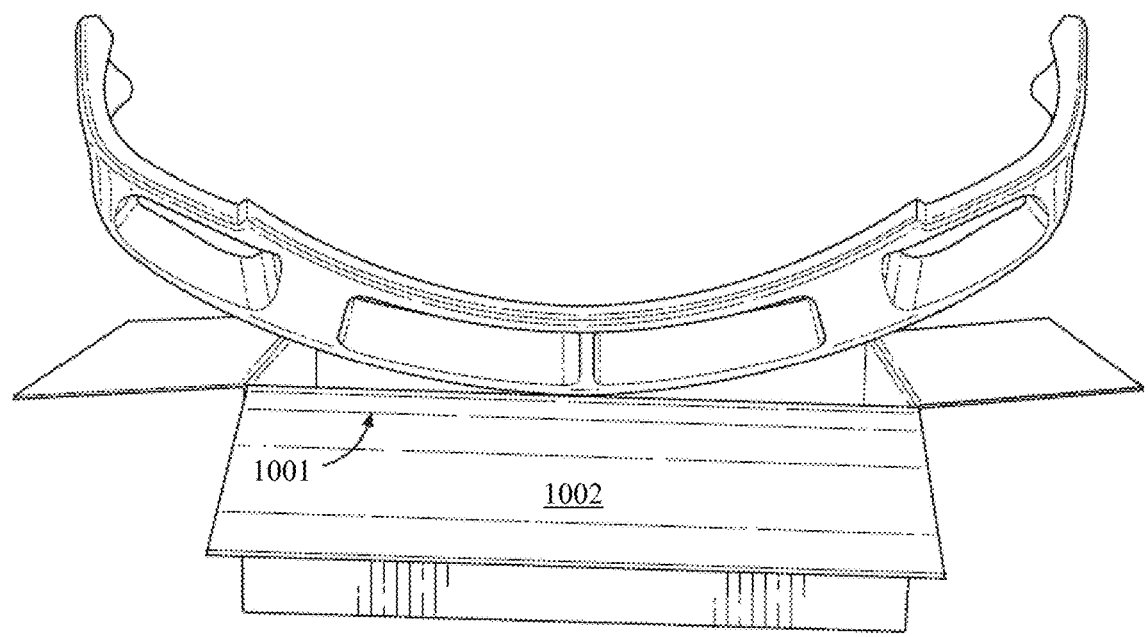
FIG. 10 shows the side view of another example of the foldable bumper in an unfolded state, according to an aspect.

FIG. 10 shows the side view of another example of the foldable bumper 1001 in an unfolded state, according to an aspect. The foldable bumper 1001, as shown, may be larger than a box 1002 used for shipping, and may be folded into a more compact shape for ease and lowered cost of shipping. The bumper 1001 may be a shape-memory bumper, and the shape-memory vehicle bumper may have an original shape fitting in a first shipping box. As an example, the foldable bumper 1001 may be left out in sunlight for approximately fifteen minutes or heated in some fashion to be sufficiently warmed for folding.

FIGS. 11a-11e show exemplary steps in an example of a rolling process for compacting the foldable bumper 1101 for shipping, packaging, or transport, according to an aspect. By applying force to the bumper, which may be a shape-memory vehicle bumper, the original shape of the bumper may be converted into a deformed shape of the shape-memory vehicle bumper, such that it fits within a second shipping box. The second shipping box may, for example, be a fraction by volume of the first shipping box. The fraction may, for example, be approximately ⅓, when the bumper is rolled into a compact shape. As another example, the fraction may be approximately ½, such as, for example, when the bumper is folded, as will be discussed when referring to FIGS. 16a-16e.

Figure 11A:
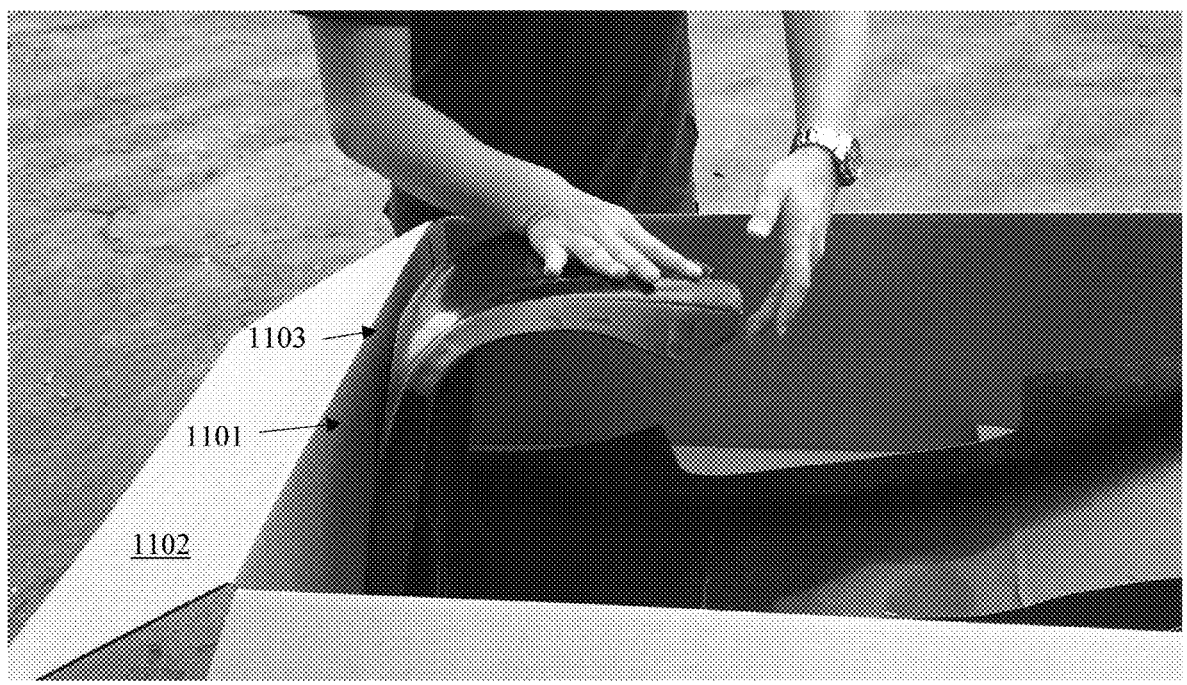
FIGS. 11a-11e show exemplary steps in an example of a rolling process for compacting the foldable bumper for shipping, packaging, or transport, according to an aspect.

FIG. 11a shows the partial top perspective view of the foldable bumper 1101 in a partially folded state, according to an aspect. One end or corner 1103 of the bumper 1101 may be rolled down to begin the rolling process.

Figure 11B:
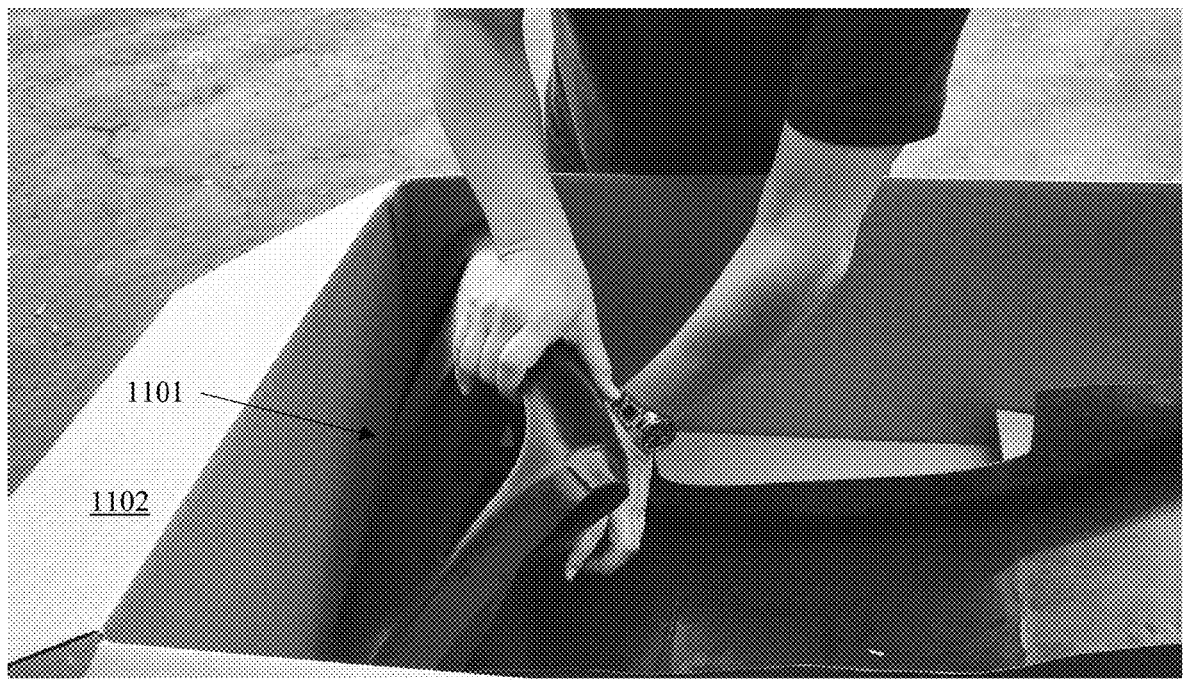
Figure 11C:
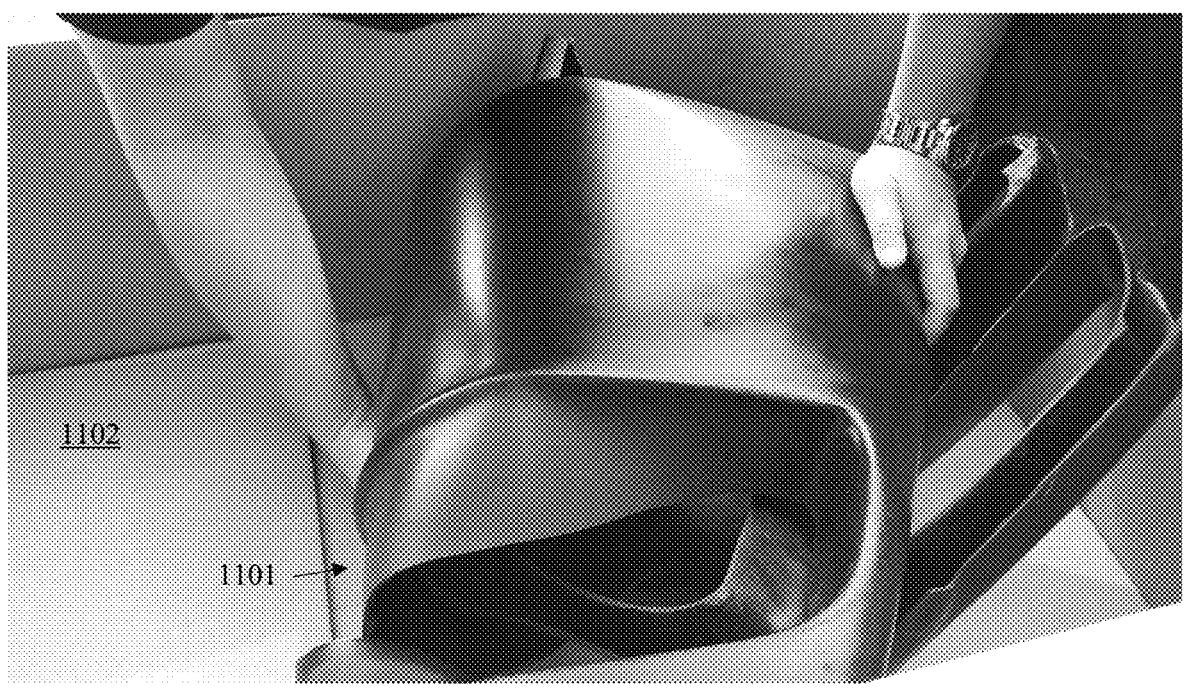

FIGS. 11b-11c show stages of the rolling process to compress the bumper 1101 into a compact size and shape within the shipping box 1102, according to an aspect.

Figure 11D:

FIG. 11d shows the top perspective view of the bumper 1101 in a compact size and shape, according to an aspect. The rolled bumper 1101 may be packed into and shipped within any standard shipping box, such as box 1102 as shown.

Figure 11E:
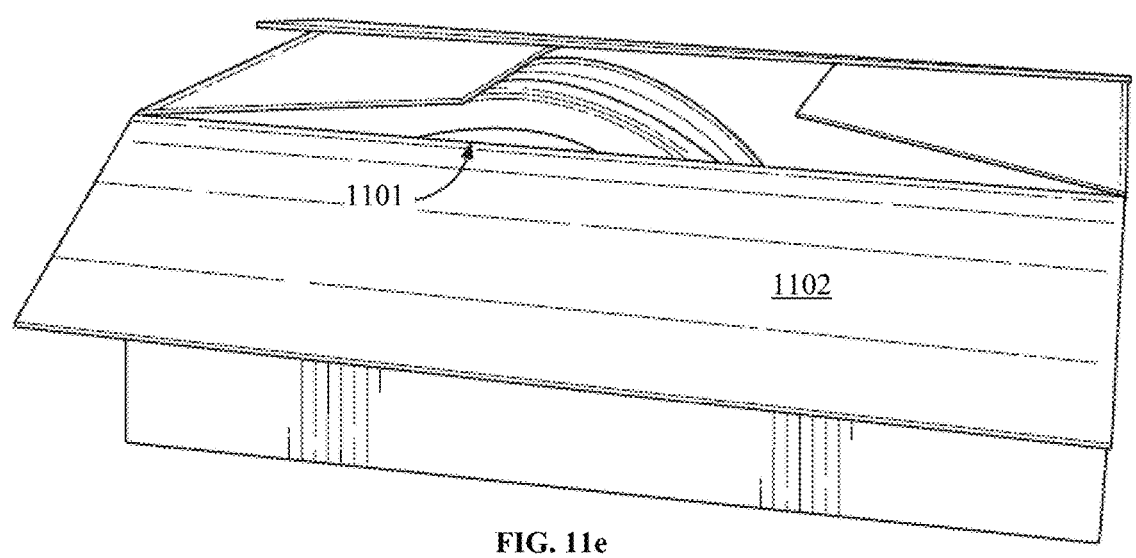

FIG. 11e shows an example of a shipping box 1102 that may be fully closed with a folded or rolled bumper 1101 inside, according to an aspect. As an example, the closure of the shipping box 1102 may keep the bumper 1101 in a rolled or folded state, such that tying of the bumper may not be necessary.

Figure 12A:
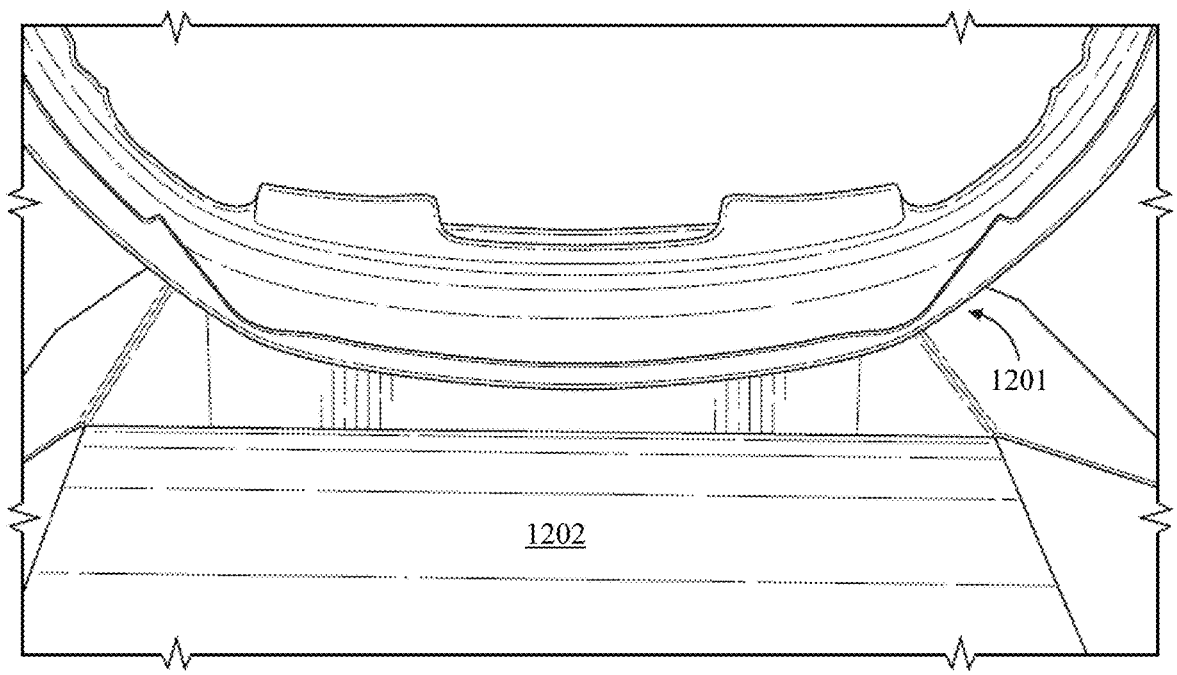
FIGS. 12a-12c show the bottom perspective view, the top perspective view, and the side perspective view, respectively, of the foldable bumper immediately after removing it from the box and unfolding the bumper from a compact shape, according to an aspect.
Figure 12B:
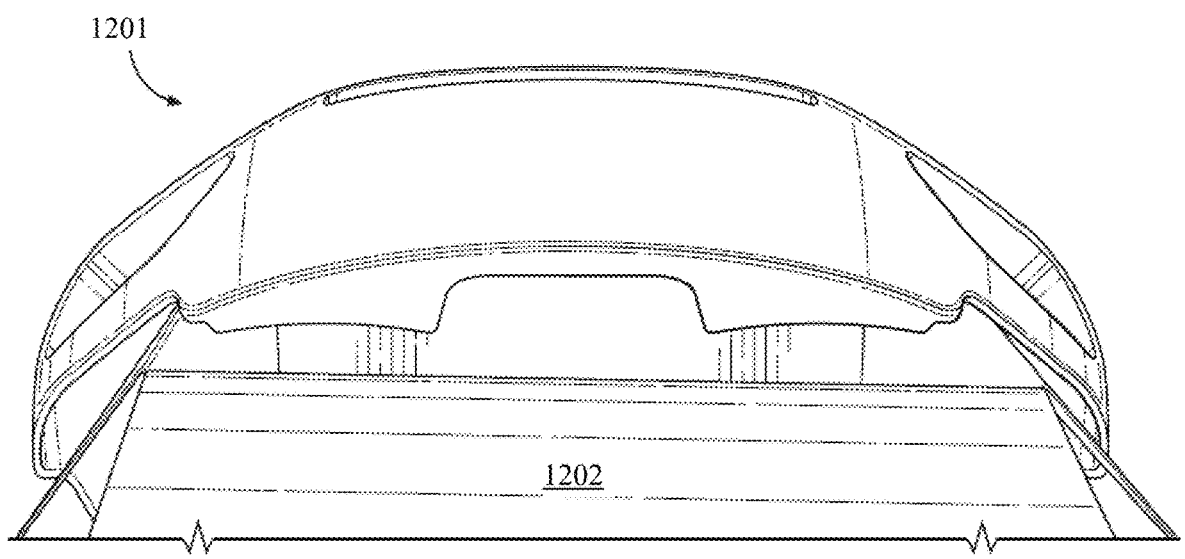
Figure 12C:
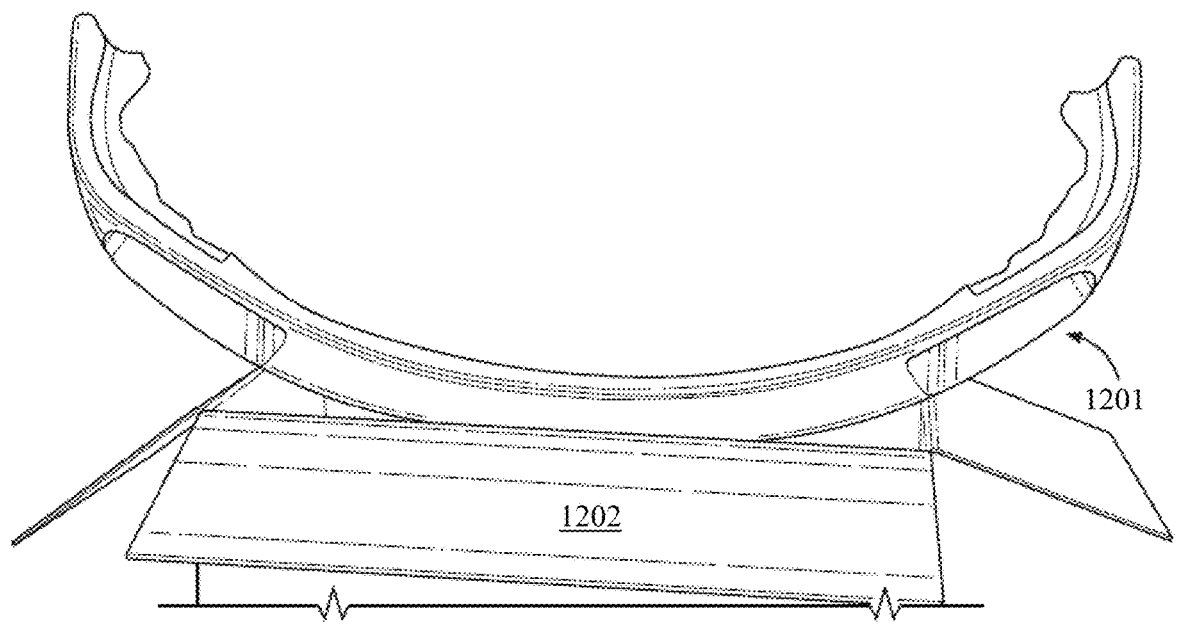

FIGS. 12a-12c show the bottom perspective view, the top perspective view, and the side perspective view, respectively, of the foldable bumper 1201 immediately after removal from the shipping box 1202 and unfolding the bumper out of the compact shape of FIG. 11d, according to an aspect. As shown, the foldable bumper 1201 may be configured to quickly return to its shape after removing from a folded state. In order for the bumper 1201 to return to its original shape, the bumper 1201 may be heated, if needed. Removal from heat may then maintain the bumper 1201 in its original shape.

Figure 13:
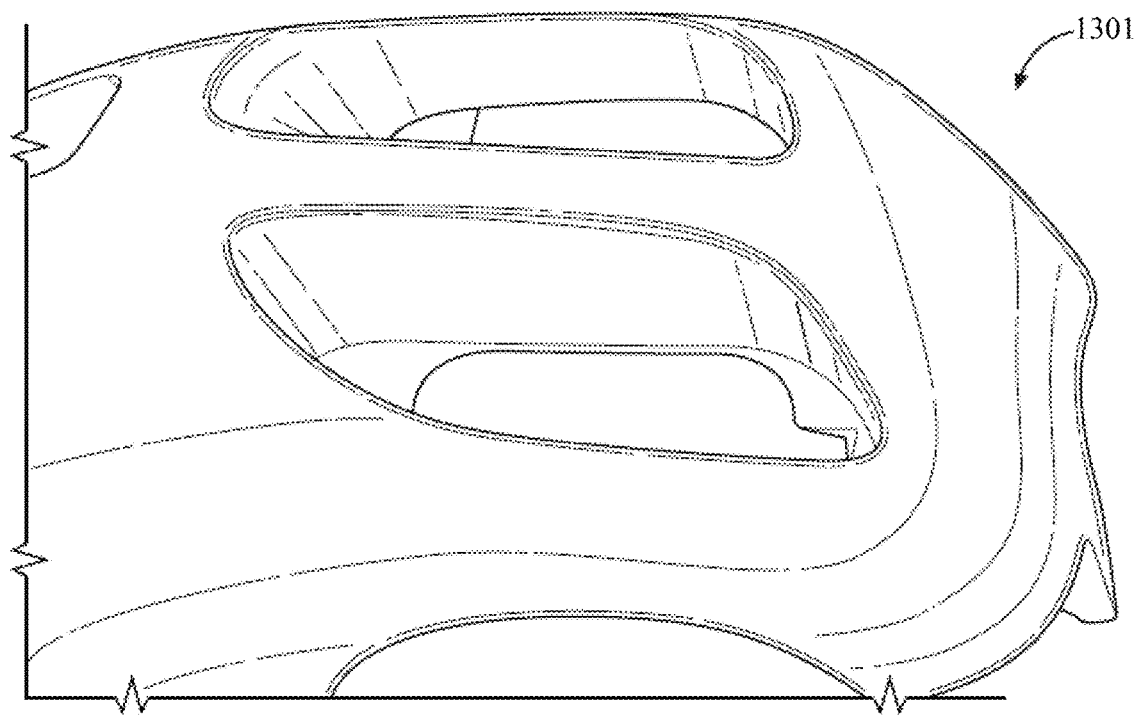
FIG. 13 shows a detailed top view of a corner of the foldable bumper, according to an aspect.

FIG. 13 shows a detailed top view of a corner of the foldable bumper 1301, according to an aspect. The surface of the bumper 1301 may be resistant to cracks, dents, and other damage due to the memory agent of the composition used to construct the bumper.

Figure 14:
FIG. 14 shows the front perspective view of the foldable bumper heated within a heat box, according to an aspect.

FIG. 14 shows the front perspective view of the foldable bumper 1401 heated within a heat box 1409, according to an aspect. As an example, a heat booth or room may also be used for heating the bumper 1401. Heat may be used when shipping to make the bumper softer and easier to fold or may be used when a user unboxes a bumper. When unboxing a bumper heat may activate the memory agent allowing the bumper to return to its original shape. As another example, the user may unbox the bumper and may obtain the original shape of the bumper without heat. As an example, if heat is used, approximately fifteen minutes of heat in a typical heat box used by a body shop may be recommended. Irrespective of the heat source (e.g., sun light or a heat box), there is some correlation between the time of exposure and the temperature of the air surrounding the bumper. For example, the temperature range may be 75 to 170 Fahrenheit degrees and the time range of exposure may be 10-40 minutes. At a given temperature, a user may perform a visual inspection of the bumper and remove the bumper from the heat source once the bumper returned to its original shape.

Figure 15:
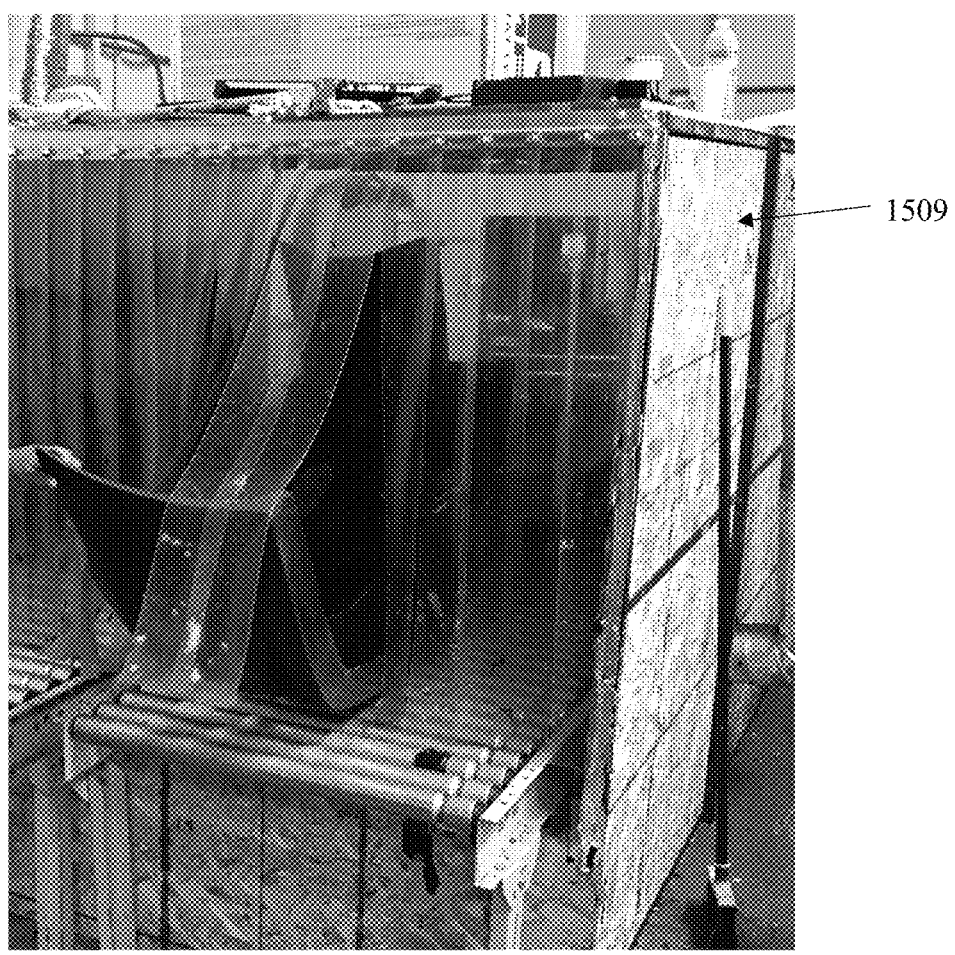
FIG. 15 shows the front perspective view of the foldable bumper after heating, and being removed from a heat box, according to an aspect.

FIG. 15 shows the front perspective view of the foldable bumper 1501 after heating, and being removed from a heat box 1509, according to an aspect. As shown, after heating, the foldable bumper 1501 will return to its original shape.

FIGS. 16a-16e show the exemplary steps of a folding process for compacting the bumper 1601 for shipping, packaging, or transport, according to an aspect. Again, by applying force to the bumper, which may be a shape-memory vehicle bumper, the original shape of the bumper may be converted into a deformed shape of the shape-memory vehicle bumper, such that it fits within a second shipping box. The second shipping box may, for example, be a fraction by volume of the first shipping box. The fraction may, for example, be approximately ½, such as, for example, when the bumper is folded.

Figure 16A:
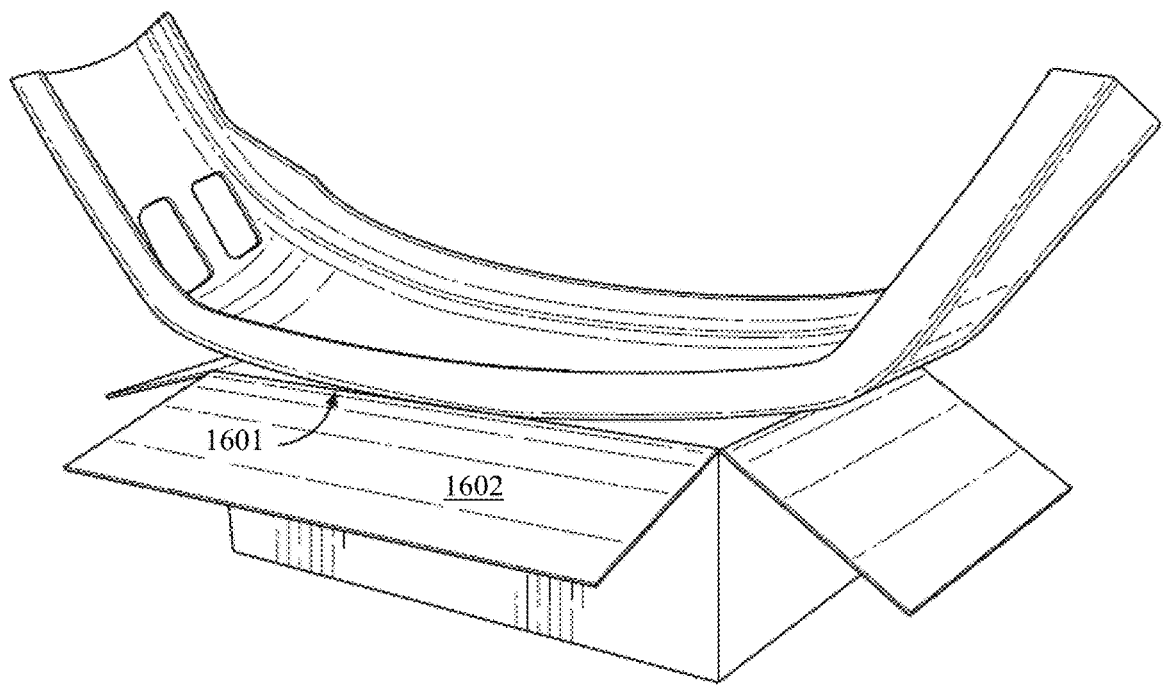
FIGS. 16a-16e show the exemplary steps of a folding process for compacting the bumper for shipping, packaging, or transport, according to an aspect.

FIG. 16a shows the foldable bumper 1601 in its original shape, which may be larger than a standard shipping box 1602 accepted by shipping services, according to an aspect.

Figure 16B:
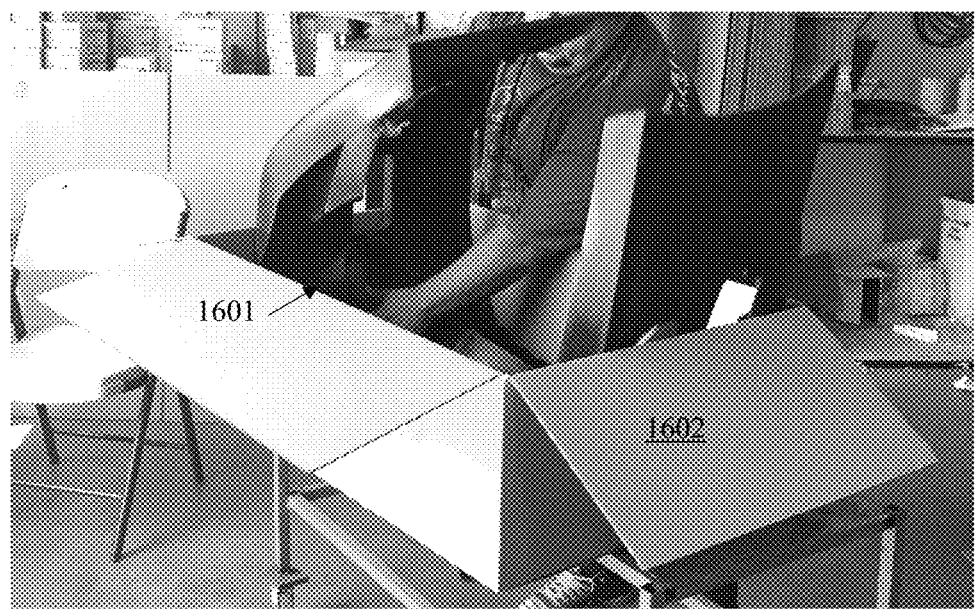
Figure 16C:
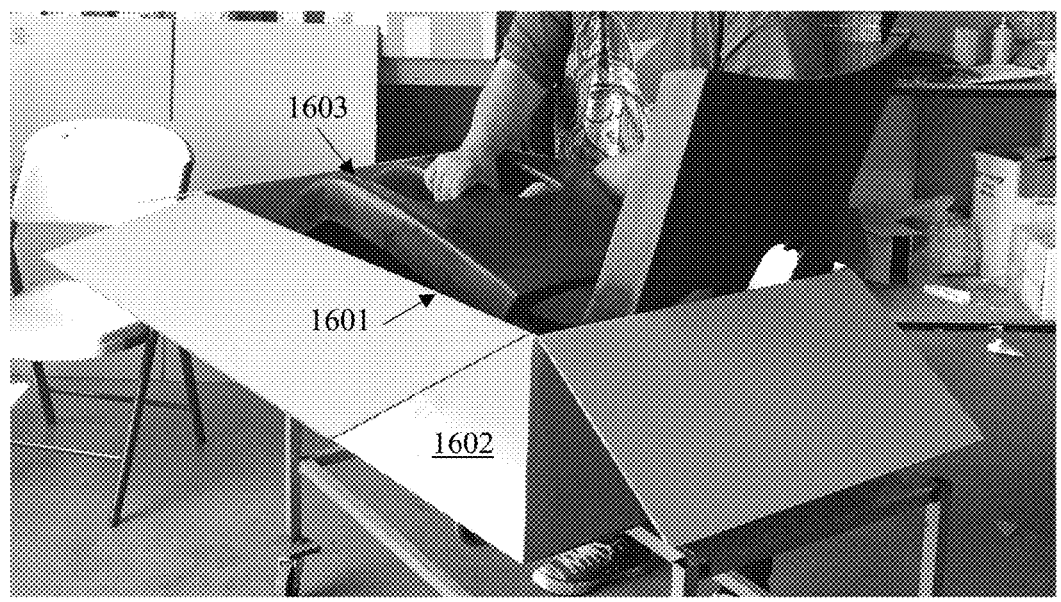
Figure 16D:
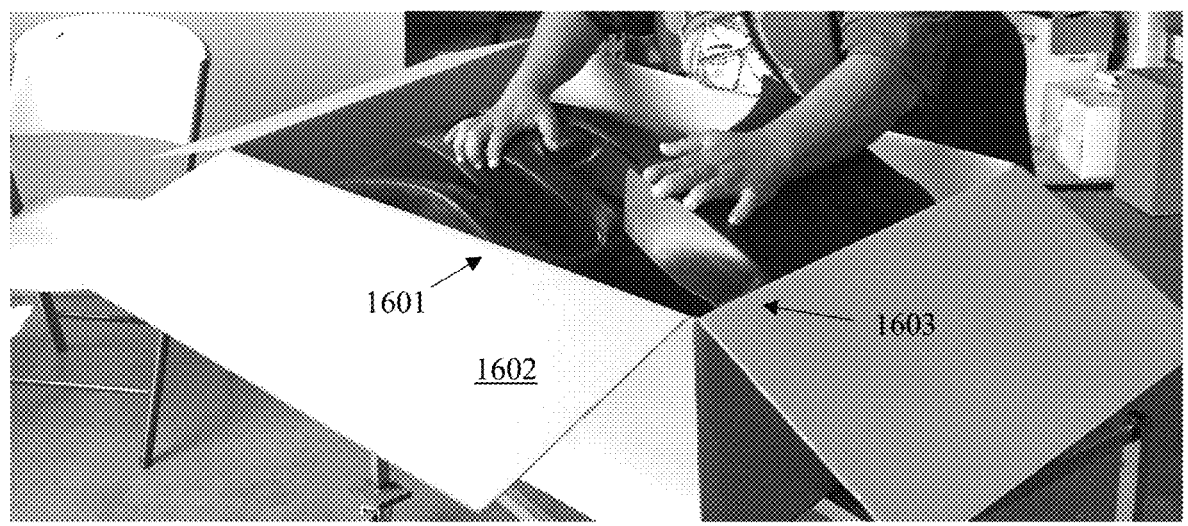
Figure 16E:
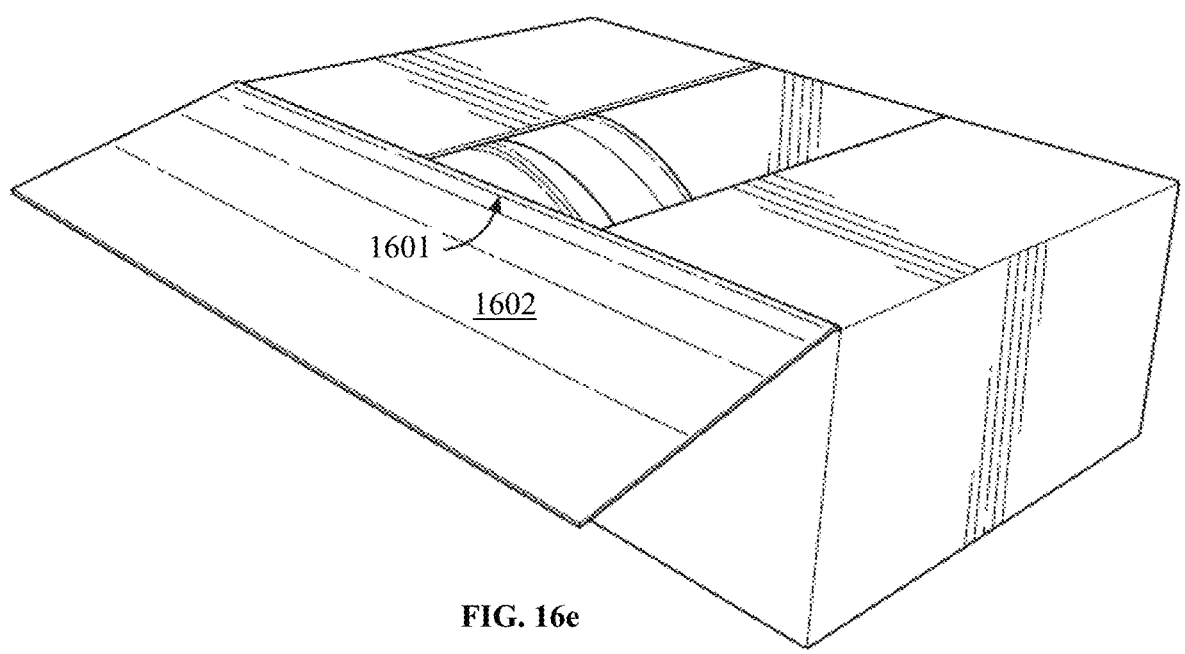

FIG. 16b shows the first step in the exemplary folding process, according to an aspect. The foldable bumper 1601 may first be folded into a U-shape in order to fit a middle portion into the shipping box 1602. Next, as shown in FIG. 16c, a first end 1603 of the bumper may be folded down. Next, as shown in FIG. 16d, the second end 1603 may be folded down over the first end. The box 1602 may then be closed as shown in FIG. 16e and sealed for shipping.

Upon receipt of the package, the user may unbox the bumper 1601 and may then apply heat for the original shape of the bumper to be retained. The user may also use a heat box as shown in FIGS. 14-15, or may use sunlight, or may use any other suitable heating device to apply heat to the bumper.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A method of manufacturing, packing and shipping a vehicle bumper integrally made of a shape-memory composition comprising the steps of:
    dispensing into a bumper mold the shape-memory composition to form an original shape of an integral shape-memory vehicle bumper, the shape-memory composition comprising about 45%-55% by weight isocyanate and about 45%-55% by weight resin, wherein the resin comprises a memory agent, wherein, after curing, the shape-memory composition has a Shore hardness of about 60-70 on D scale, the shape-memory vehicle bumper having a middle portion and a first end and a second end both extending from opposite ends of the middle portion, the shape-memory vehicle bumper having the original shape fitting in a first shipping box;
    applying force to the shape-memory vehicle bumper such that to cause a conversion of the original shape into a deformed shape of the shape-memory vehicle bumper, the deformed shape fitting into a second shipping box that is a fraction by volume of the first shipping box;
    placing the shape-memory vehicle bumper having the deformed shape into the second shipping box; and
    sealing and shipping the second shipping box.

2. The method of claim 1 further comprising:
    once arrived at destination, removing the shape-memory vehicle bumper having the deformed shape from the second shipping box; and
    exposing the shape-memory vehicle bumper to heat until the deformed shape is converted back to the original shape.

3. The method of claim 1 further comprising exposing the shape-memory vehicle bumper to heat before applying force to the shape-memory vehicle bumper.

4. The method of claim 1 wherein the fraction is about ⅓.

5. The method of claim 1 wherein the dispensing into the bumper mold of the shape-memory composition if performed by injection molding.

6. The method of claim 1 wherein the deformed shape is obtained by folding the original shape.

7. The method of claim 1 wherein the deformed shape is obtained by folding the first end over the middle portion and the second end over the first end.

8. The method of claim 1 wherein the deformed shape is obtained by rolling the original shape.

9. A method of manufacturing, packing and shipping a vehicle bumper comprising the steps of:
dispensing into a bumper mold a shape-memory composition to form an original shape of an integral shape-memory vehicle bumper, the shape-memory composition comprising about 45%-55% by weight isocyanate and about 45%-55% by weight resin, wherein the resin comprises a memory agent, wherein, after curing, the shape-memory composition has a Shore hardness of about 60-70 on D scale, the shape-memory vehicle bumper having a middle portion and a first end and a second end both extending from opposite ends of the middle portion, the shape-memory vehicle bumper having the original shape fitting in a first shipping box;
applying force to the shape-memory vehicle bumper such that to cause a conversion of the original shape into a deformed U-shape wherein the middle portion is a base of the U-shape and the first and second end are arms of the U-shape;
placing the base of the deformed U-shape into a second shipping box that is a fraction by volume of the first shipping box;
folding the first end over the middle portion and the second end over the first end of the shape-memory vehicle bumper; and
sealing and shipping the second shipping box.

10. The method of claim 9 further comprising:
once arrived at destination, removing the shape-memory vehicle bumper having the deformed shape from the second shipping box; and
exposing the shape-memory vehicle bumper to heat until the deformed shape is converted back to the original shape.

11. The method of claim 9 further comprising exposing the shape-memory vehicle bumper to heat before applying force to the shape-memory vehicle bumper.

12. The method of claim 9 wherein the fraction is about ½.

13. The method of claim 9 wherein the dispensing into the bumper mold of the shape-memory composition if performed by injection molding.

14. A shipping system for shipping a vehicle bumper comprising:
a first shipping box; and
a shape-memory vehicle bumper made from a shape-memory composition, the shape-memory composition comprising about 45%-55% by weight isocyanate and about 45% -55% by weight resin, wherein the resin comprises a memory agent, wherein, after curing, the shape-memory composition has a Shore hardness of about 60-70 on D scale, the shape-memory vehicle bumper having a deformed shape and being enclosed within the first shipping box, wherein the deformed shape was derived from an original shape of the shape-memory vehicle bumper by applying force to the original shape, the shape-memory vehicle bumper having the original shape fitting in a second shipping box, the first shipping box being a fraction by volume of the second shipping box, and wherein the shape-memory composition causes returning to the original shape upon removal of the shape-memory vehicle bumper having the deformed shape from the first shipping box.

* * * * *